United States Patent
Abalin et al.

(10) Patent No.: US 6,456,680 B1
(45) Date of Patent: *Sep. 24, 2002

(54) METHOD OF STRONTIUM-89 RADIOISOTOPE PRODUCTION

(75) Inventors: S. S. Abalin, Moscow (RU); Y. I. Vereschagin, Moscow (RU); G. Y. Grogoriev, Moscow (RU); V. A. Pavshook, Moscow (RU); N. N. Ponomarev-Stepnoi, Moscow (RU); V. E. Khvostionov, Moscow (RU); D. Yu. Chuvilin, Moscow (RU)

(73) Assignee: TCI Incorporated, Albuquerque, NM (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 54 days.

(21) Appl. No.: 09/538,333

(22) Filed: Mar. 29, 2000

(51) Int. Cl.$^7$ .................................................. G21G 1/06
(52) U.S. Cl. ........................ 376/189; 376/311; 376/314; 376/358; 250/432 PD
(58) Field of Search ................................. 376/189, 170, 376/311, 313, 314, 354, 358; 423/262; 250/432 PD

(56) References Cited

U.S. PATENT DOCUMENTS

| | | | | |
|---|---|---|---|---|
| 2,815,321 A | * | 12/1957 | Wigner, II et al. | 376/356 |
| 2,860,093 A | * | 11/1958 | Wigner, I et al. | 376/356 |
| 2,945,794 A | * | 7/1960 | Winters et al. | 376/356 |
| 3,074,776 A | * | 1/1963 | Ryan et al. | 23/2 |
| 3,080,307 A | * | 3/1963 | Rinald | 376/356 |
| 3,154,473 A | * | 10/1964 | Martin, II | 376/358 |
| 3,166,478 A | * | 1/1965 | Lindstrom | 376/356 |
| 3,217,471 A | * | 11/1965 | Silverman | 376/314 |
| 3,284,305 A | * | 11/1966 | Urey et al. | 376/356 |
| 3,791,107 A | * | 2/1974 | Gustavsson | 55/179 |
| 3,803,802 A | * | 4/1974 | Schroter et al. | 55/66 |
| 3,871,841 A | * | 3/1975 | Queiser et al. | 55/66 |
| 3,944,646 A | * | 3/1976 | Martin, I | 423/219 |
| 4,012,490 A | * | 3/1977 | Lofredo | 423/262 |
| 4,532,102 A | * | 7/1985 | Cawley | 376/356 |
| 5,596,611 A | * | 1/1997 | Ball, I | 376/189 |
| 5,875,220 A | * | 2/1999 | Zhuikov et al. | 376/189 |

OTHER PUBLICATIONS

Hitachi Review, vol. 23, No. 1, pp 2–7, Saito et al, 1974.*
Appl. Radiat. Isot., vol. 40, No. 4, pp 315–324, Cheng et al, 1989.*
Nuclear Sci. and Eng., vol. 13, pp 297–298, Townley et al. (I), Jul. 1962.*
Nuclear Sci. and Eng., vol. 10, pp 346–351, Townley et al (II), 1961.*
Federal Document Clearing House Congressional Testimony, by Ball (II), Dec. 6, 1993.*

* cited by examiner

*Primary Examiner*—Harvey E. Behrend
(74) *Attorney, Agent, or Firm*—R W Becker & Associates; R W Becker

(57) ABSTRACT

Inert gaseous fission products, including beryllium, rubidium, and krypton isotopes, resulting from the operation of a uranyl sulfate water solution nuclear reactor are passed through a delaying device to precipitate out strontium-90, then passed to a second delaying device to precipitate out the desired strontium-89.

2 Claims, 4 Drawing Sheets

METHOD OF STRONTIUM-89 RADIOISOTOPE PRODUCTION

BACKGROUND OF THE INVENTION

1. Field of the Invention

The present invention is in the field of radioisotope production and in particular relates to a method of producing strontium-89.

2. Description of the Prior Art

Radioisotopes have been used in nuclear medicine for diagnostics and therapeutics for more than fifty years. Medical radioisotope production is an important industry using more than 50% of the radioisotopes produced in the world. More than 160 radioisotopes of 80 chemical elements are produced with the help of nuclear reactors and charged particle accelerators today.

One of the most effective modern therapeutic radioisotopes is strontium-89. It is used for pain palliation instead of drugs when treating cancer. When medicine containing strontium-89 is introduced into an organism, it is absorbed and distributed in the bone metastases providing for a long anesthetic effect.

Strontium-89 radioisotope has a half-life of 52.7 days with $\beta$ decay (decays to $Y^{89}$, a stable isotope). The maximum energy of the $\beta$-particles is 1463 keV. The attendant $\gamma$-radiation energy is 909.1 keV.

Strontium is a biochemical analog of calcium that has the same transport mechanism in the human body. Strontium chloride $SrCl_2$ introduced to the vein is mainly accumulated in bone metastases providing for a long anesthetic effect so it is not necessary to take drugs frequently and the patient does not become tolerant of them. Malignant tumors tending to metastases in the skeleton are: mammary gland, large intestine, thyroid gland, prostate, kidney, and skin cancer. The maximum range of $\beta$-particles of strontium-89 in the bone does not exceed 7 mm, so its radiation effects are isolated to the small area of the skeleton and its radiation burden on the marrow and nearby soft tissue is not significant. As strontium-89 is incorporated in the mineral structure of the bone, diseased metabolism does not take place, and it remains there for more than 100 days. Healthy bone contains a small component of the injected dose and loses it quickly during the first fortnight. One injection of strontium chloride is about 4 mCi and is effective for 3 to 6 months. Clinical tests of the preparation based on $^{89}SrCl_3$ showed that 65–76% of the patients said that pain had been reduced significantly, and there was full anaesthetic effect in 20% of the cases. In addition, doctors think that strontium-89 chloride has a therapeutic effect, which means it does not only block metastases but also reduces them.

One reactor method of strontium-89 production consists of irradiating a target of strontium carbonate $SrCO_3$ with neutrons having a thermal neutron spectrum. A target made from metallic strontium is irradiated by the neutron flux of a nuclear reactor. Natural strontium consists of the following isotopes: $Sr^{84}$ at 0.56%, $Sr^{86}$ at 9.9%, $Sr^{87}$ at 7.0% and $Sr^{88}$ at 82.6%. The strontium-89 radioisotope is formed in the target as a result of the neutron capture reaction of one of the strontium isotopes $Sr^{88}(n,\gamma) Sr^{89}$. A highly enriched target containing $Sr^{88}$>99.9% is used because it is necessary to eliminate strontium-85 from the reaction $Sr^{84} (n,\gamma) Sr^{85}$, an undesirable admixture. This is a convenient production method and takes place in a normal research reactor. The cross-section of the $(n,\gamma)$-reaction is only $6\times10^{-27}$ cm$^2$, however, which restricts the productivity of this method.

Another strontium-89 production method is based the threshold reaction of neutron capture with the emission of a charged particle $Y^{89}$ (n,p) $Sr^{89}$. A target containing natural monoisotope Yttrium-89 is irradiated in the neutron flux of a nuclear reactor with a fast neutron spectrum and is subsequently subjected to radiochemical reprocessing for extraction. Strontium-89 production can achieve about 10–15 mCi per gram of yttrium in optimum conditions. The target is a pellet of yttrium oxide $Y^2O^3$ of high purity that is pressed and annealed at 1600° C. This method produces almost no radioactive wastes and the end-product does not contain harmful admixtures, e.g., the quantity of attendant strontium-90 is less than $2\times10^{-4}$ atomic percent.

This method has an extremely low productivity due to the small cross-section of the (n,p)-reaction on $Y^{89}$, less than $0.3\times10^{-27}$ cm$^2$ for neutrons of the fission spectrum. It can only occur in reactors with a fast neutron spectrum, and there are few in existence. In addition, yttrium purified without admixtures of uranium should be used (the uranium content in the $Y^2O^3$ pellets must not exceed $10^{-5}$ by mass). Low productivity and the need for reactors with a fast neutron spectrum are the main problems with this method.

There is clearly a need for a more efficient method for the production of strontium-89, particularly one that uses a relatively low power reactor.

SUMMARY OF THE INVENTION

A solution nuclear reactor containing a uranyl sulfate fuel solution produces krypton-89 during operation. Krypton-89 is in the form of a gas that bubbles to the surface of the fuel solution and occupies the enclosed volume above the fuel. An inert gas transports the krypton-89, along with other radioisotope fragments, in a sealed system to a trap area where any accompanying relatively short half-life krypton-90 is allowed to decay to strontium-90. The strontium-90 is removed. Then the krypton-89 is transported to a catching system where it remains until it fully decays to strontium-89. The strontium-89 is removed from the inert gas with the help of sorption in a carbon trap or by chemical interaction in an acid environment. The inert gas is returned to the reactor core.

DESCRIPTION OF THE PREFERRED EMBODIMENT

The strontium-89 production method is based upon a unique ability to effect not only the final radioisotopes, but also its precursors produced as a result of the nuclear transformation of products in the decay chain of elements with mass 89 occurring in a nuclear solution reactor. The decay chain is $Se^{89}\rightarrow Br^{89}\rightarrow Kr^{89}\rightarrow Rb^{89}\rightarrow Sr^{89}$.

A liquid fuel nuclear reactor having a uranyl sulfate water solution $(UO_2SO_4)$ core is used in the present invention. Uranium-235 and/or uranium-233 can be used as fissionable material in the fuel solution of uranyl sulfate. The Russian Argus reactor was the particular reactor used. It used 90% enriched $U^{235}$ in a concentration of 73.2 g/l in the water solution. The uranyl sulfate water solution volume (pH=1) was 22 liters. It can be brought up to its rated power of 20 kW in 20 minutes. The thermal neutron flux density in the central channel is $5\times10^{11}$ neutrons/cm²s.

Homogenous solution fuel reactors have a number of advantages over hard fuel reactors. They have large negative temperature and power reactivity effects, which provides for their high nuclear safety. The core design is much simpler. There are no fuel element cladding spacers and other parts reducing the neutron characteristics. Solution preparation is much cheaper than fuel element production. Solution fuel loading (pouring) is much easier too, and makes it possible to change the fissionable material concentration in fuel or solution volume if necessary. There can be no local overheating provoked by power density field deformations in the core of the solution reactor, thanks to good conditions for heat transfer. These reactors are simple and reliable in operation and do not require a large staff for their operation.

A number of radioactive inert gases are produced in uranyl sulfate solution reactor during its operation, including the desired krypton-89. The majority of these gases leave the solution in the gas phase, accumulating above the liquid surface. The process by which this takes place is based on "radiolytic boiling." Gas bubbles containing water vapor and hydrogen form in the tracks of fission fragments. The vapor is condensed within about $10^{-8}$ seconds and a gas bubble forms having a radius of about $10^{-5}$ cm. Fission fragments either get into the gaseous bubble during its generation or afterwards by diffusing from the solution. They then migrate to the surface of the fuel solution. The radiolytic gas bubbles rise to the surface in only a couple of seconds, making it possible to remove relatively short-life radioisotopes, such as krypton-89. Bubbling the fuel with an inert gas can speed up this process of removal of fragment gases. Krypton-89, along with small quantities of other fission fragment elements are produced at the same time.

Figure 1A:
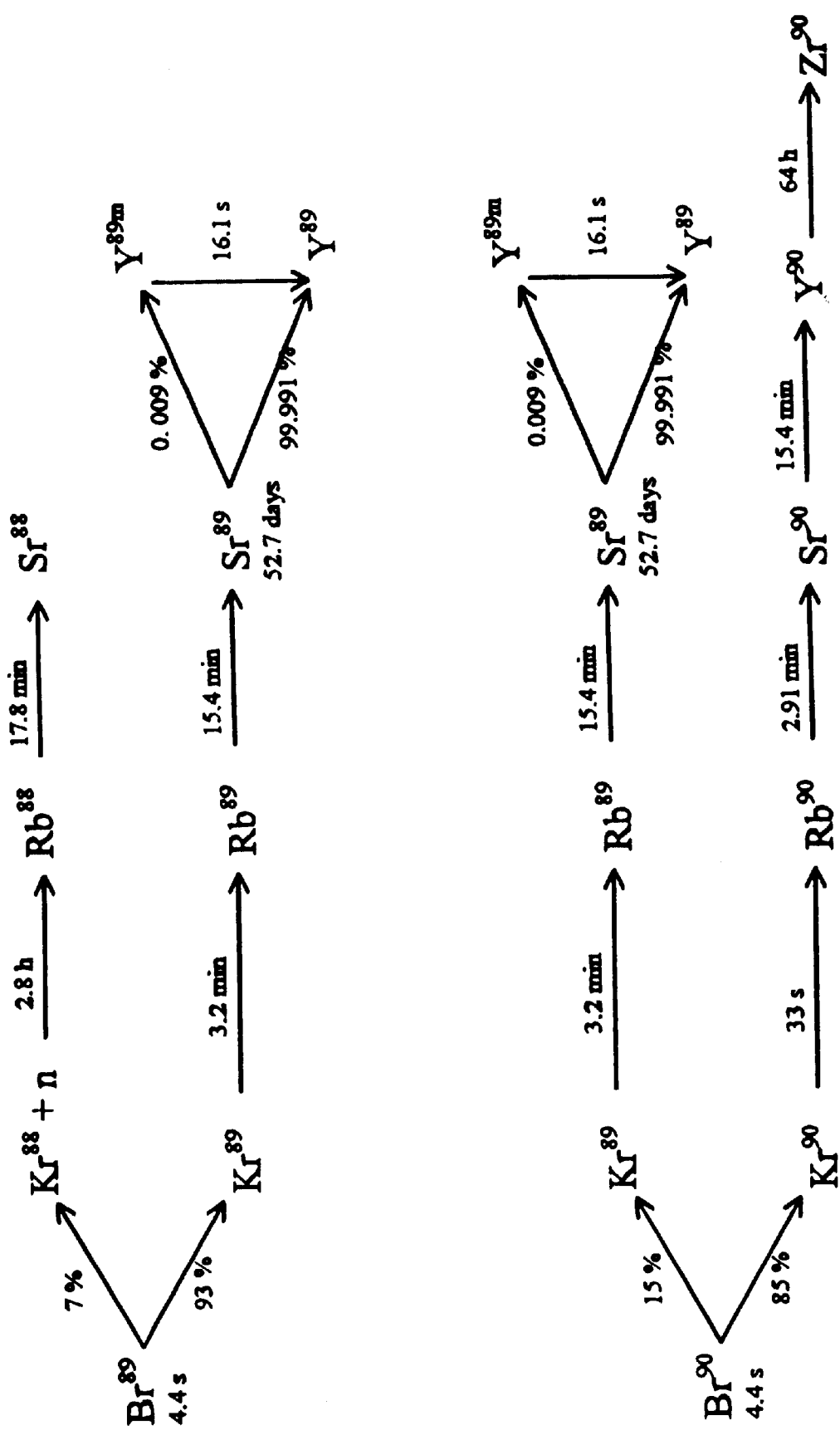
FIG. 1A shows the fission products decay of $Br^{89}$ and $Br^{90}$.
Figure 1B:
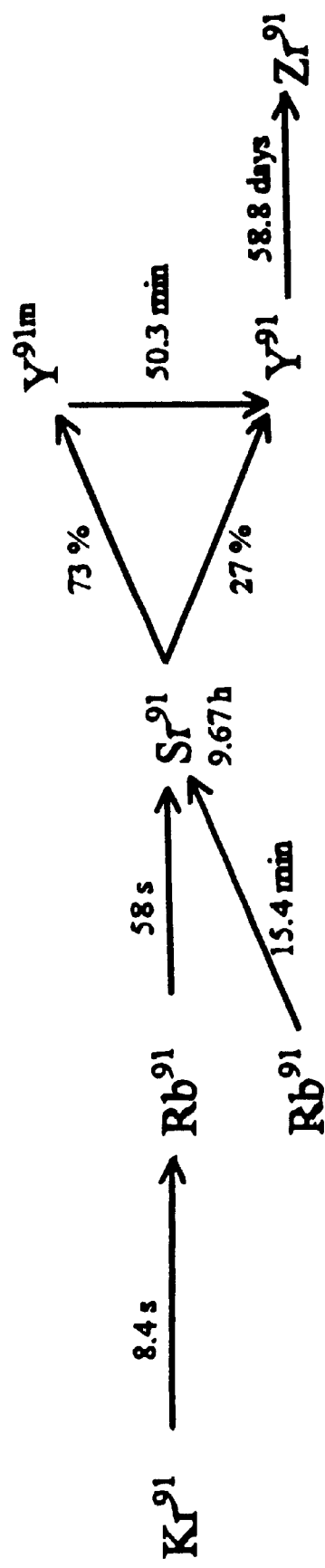
FIG. 1B shows the fission products decay of $Kr^{91}$.
Figure 1C:
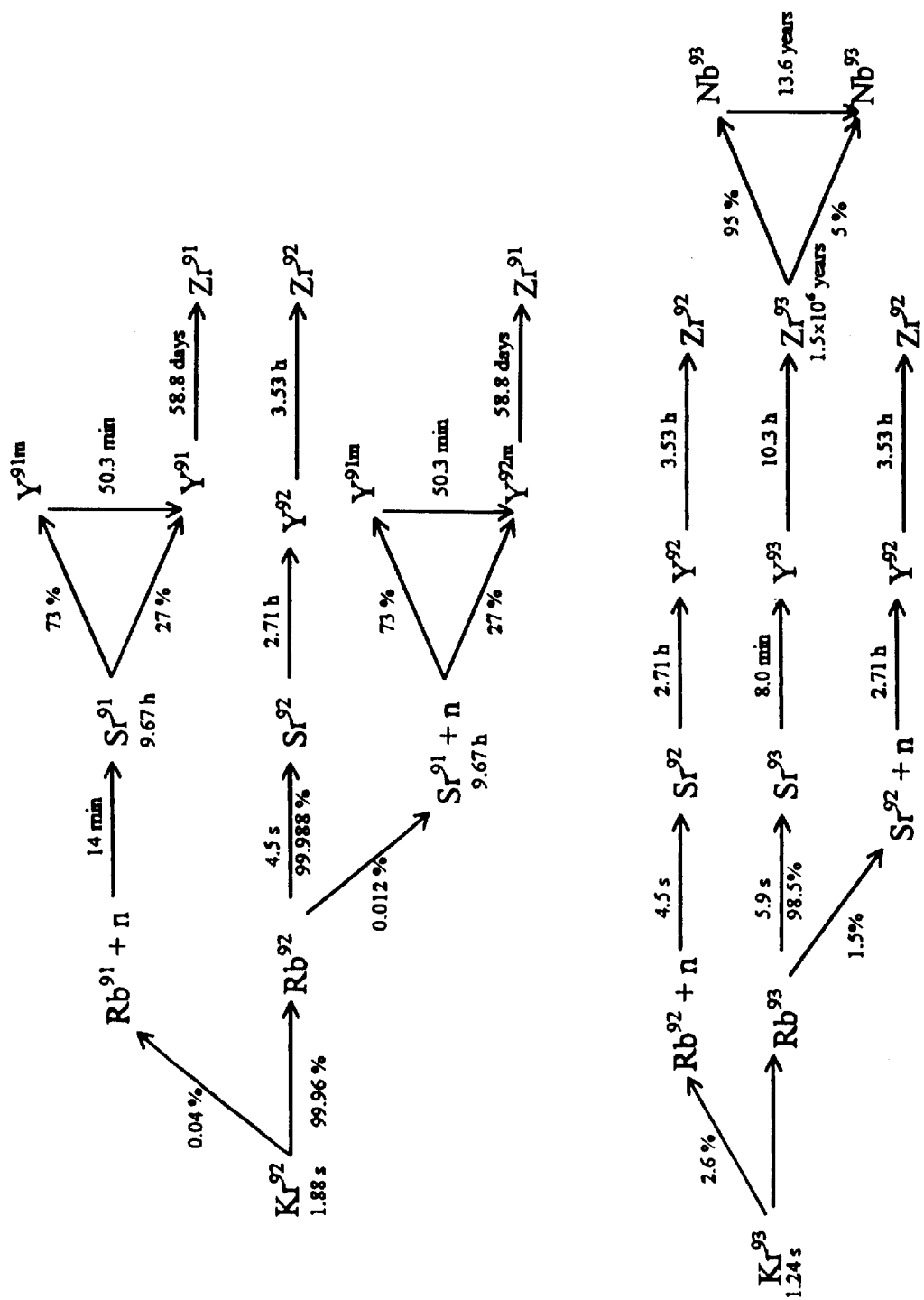
FIG. 1C shows fission products decay of $Kr^{92}$ and $Kr^{93}$.

The main chains of fission products' decay resulting in strontium radionuclides whose gaseous precursors have a half-life of more than one second are shown in FIGS. 1A to 1C. One of the fission products is krypton-89 ($Kr^{89}$), a radioactive isotope of the inert gas, krypton, preceding strontium-89 in the decay chain of fission products with an atomic mass of 89. It has a half-life of 3.2 minutes, decaying to rubidium-89. Rubidium-89 decays with a half-life of 15.4 minutes to the desired strontium-89. Other isotopes of krypton, however, also bubble to the surface, including the highly undesirable precursor to strontium-90, krypton-90. Krypton-90 decays in 33 seconds to rubidium-90 and in 2.91 minutes to strontium-90. Because krypton-89 and krypton-90 are gases and because of the differential in half-life of the two isotopes, it is relatively easy to separate the two. There is no such possibility in the core of a typical nuclear reactor in which the fissionable material, e.g., $U^{235}$, is a hard oxide or metal enclosed in the cladding of fuel elements. Other radioactive components with half-lives short compared to krypton-89 can also be readily separated.

The high productivity of this method is primarily the result of: (1) the large cross-section of the decay reaction (n,f) of up to $600-800\times10^{-24}$ for thermal neutrons for such nuclei as $U^{235}$, $U^{233}$, or $Pu^{239}$; and (2) the ability to remove the krypton-89 from other gaseous end products of the reaction due to differential decay. For a unit target, this method is about 1000 times more efficient than the prior art. Because the half-life of krypton-89 (190.7 seconds) is significantly longer than that of krypton-90 (32.2 seconds), it is possible to decrease the content of strontium-90 in the mixture to about $10^{-4}$ atomic percent, providing for high radioisotope purity in the strontium-89.

Figure 2:
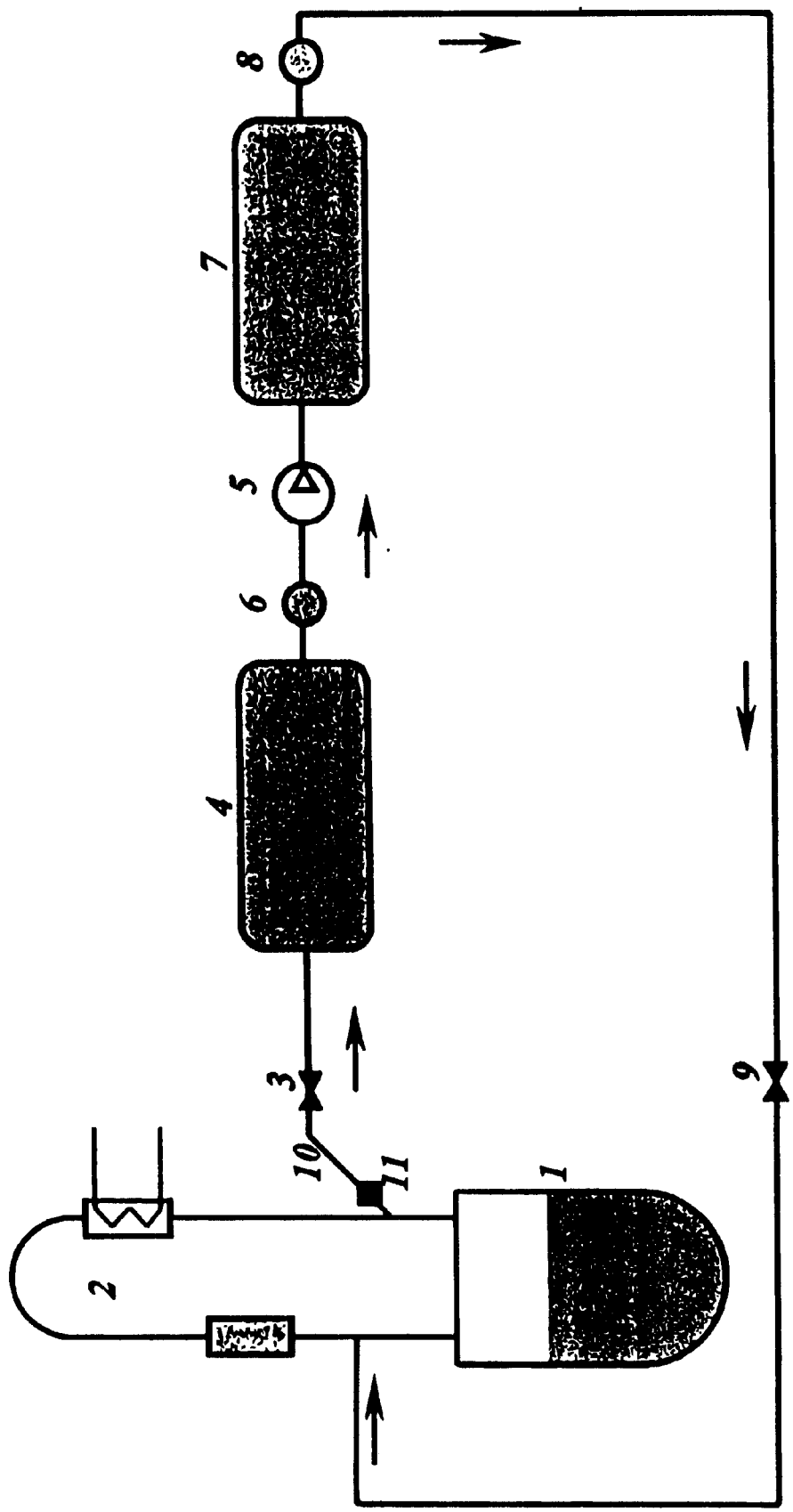
FIG. 2 is a schematic of the gas loop for $Sr^{89}$ production.

The method of strontium extraction via a continuous gas loop is illustrated in FIG. 2. The process is begun after the transitional processes bound up with the reactor start-up are finished (about 20 minutes). Referring to FIG. 2, valves 3 and 9 are opened and a gas pump 5 is turned on. Gas from above the fuel solution is moved to a delaying line 4. The delaying line is designed to keep the gas from arriving at the precipitation device 7 for the time necessary for krypton-90 to decay to strontium-90, thereby removing it from the gas mixture. Rubidium and strontium isotopes that have not precipitated in the delaying line settle in the filter 6. The diameter of the delaying line pipe is determined by the condition of laminar gas flow in the pipe. The pipe's length is determined by the delay time for a preset gas flow rate. (If the gas flow rate is about 2 l/min, a delay time of ten minutes is achieved when the pipe inner diameter is 10 mm and the pipe length is 255 meters. If the diameter were 20 mm, a delay line length of 64 meter would give a 10-minute delay.) A ten minute delay yields a radionuclide purity ($Sr^{90}/Sr^{89}$) of about $3\times10^{-8}$.

After going through the delaying line, the gas arrives at the strontium-89 precipitation device 7. The precipitation device is another pipe whose diameter and length are designed for a delay period sufficient for the remaining krypton-89 to decay to strontium-89. This would be about 30 minutes at a gas flow rate of 2 l/minute. Those isotopes of rubidium and strontium, which have not precipitated in the precipitation device, pass through it and settle in the filter 8. The gas, less those fission fragments that have precipitated out or otherwise been removed, is returned to the reactor. After the cycle of strontium-89 production is completed, the valves 3, 9 are closed. Strontium-89 deposited in the precipitation device and in the filter 8 are subsequently extracted.

The circulating gas flow removes water vapor from the fuel solution. The initial part of the gas pipe 10 shown in FIG. 2 is inclined so that water vapor is condensed on the pipe wall and the water runs back into the reactor vessel by gravity preventing fuel solution water loss. A trap 11 is indicated in FIG. 2 at the entrance to the gas loop to hinder non-gaseous fission fragments moved by the gas flow over the fuel solution from getting into the gas loop.

If the precipitation rate of strontium-89 is high, most of it will accumulate in the precipitation device 7. An acid solution can then be used to wash out strontium-89 from which it is subsequently extracted and subjected to radiochemical purification. If the precipitation rate is low, most of the strontium-89 will accumulate in the filter 8. This filter can consist of thin, fine nets of stainless steel. The strontium-89 can then be extracted by pumping an acid solution through the filter. Alternatively, a removable filter could be used with extraction of the strontium-89 being done at a later time.

What is claimed is:

1. A method of extracting strontium-89 from a uranyl sulfate water solution fueled nuclear reactor, the method comprising:

operating said solution nuclear reactor whereby inert gaseous fission fragments are produced and migrate to the free volume above the solution surface, said gaseous fission fragments comprised of isotopes of beryllium, krypton and rubidium;

pumping said inert gaseous fission fragments through a first delaying device to achieve an approximate ten minute delay whereby krypton-90 is substantially depleted;

passing gas through a first filter to remove rubidium and strontium isotopes that were not precipitated in said first delaying device;

pumping remaining gas through a second delaying device to achieve an approximate thirty minute delay;

passing gas through a second filter to remove any remaining rubidium and strontium isotopes that were not precipitated out in said second delay device;

pumping remaining gas back to the reactor; and extracting precipitated strontium-89 from said second delay device and from said second filter.

2. The method of claim 1 wherein the extraction of strontium-89 from said second delay device and said second filter is by an acid wash.

* * * * *